US012585531B2

(12) United States Patent
Muthiah et al.

(10) Patent No.: US 12,585,531 B2
(45) Date of Patent: Mar. 24, 2026

(54) LOCATION-BASED MAINTENANCE OPERATIONS FOR A DATA STORAGE DEVICE

(71) Applicant: Sandisk Technologies, Inc., Milpitas, CA (US)

(72) Inventors: Ramanathan Muthiah, Bangalore (IN); Niles Yang, Mountain View, CA (US); Daniel J. Linnen, Limestone, TN (US); Kirubakaran Periyannan, Saratoga, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 28 days.

(21) Appl. No.: 18/463,506

(22) Filed: Sep. 8, 2023

(65) Prior Publication Data

US 2025/0086048 A1    Mar. 13, 2025

(51) Int. Cl.
*G06F 11/00* (2006.01)
*G06F 11/07* (2006.01)
*G06F 11/34* (2006.01)

(52) U.S. Cl.
CPC ........ *G06F 11/0793* (2013.01); *G06F 11/008* (2013.01); *G06F 11/076* (2013.01); *G06F 11/3409* (2013.01)

(58) Field of Classification Search
CPC .... G06F 11/008; G06F 11/076; G06F 11/079; G06F 11/3409
See application file for complete search history.

(56) References Cited

U.S. PATENT DOCUMENTS

| | | | |
|---|---|---|---|
| 10,048,898 B2 | 8/2018 | Yang et al. | |
| 10,353,598 B2 | 7/2019 | Huang et al. | |
| 10,430,112 B2 | 10/2019 | Darragh et al. | |
| 11,264,110 B2 | 3/2022 | Prakash et al. | |
| 2014/0372674 A1 | 12/2014 | Kim et al. | |
| 2021/0200654 A1* | 7/2021 | Elmtalab ............. | G06F 12/0246 |
| 2022/0029922 A1* | 1/2022 | Mereddy ................ | H04L 41/12 |
| 2022/0357726 A1* | 11/2022 | Kanada ................. | G06T 11/206 |

(Continued)

OTHER PUBLICATIONS

Cui, et al., "Leveraging Partial-Refresh for Performance and Lifetime Improvement of 3D NAND Flash Memory in Cyber-Physical Systems", Journal of Systems Architecture (2019), doi: https://doi.org/10.1016/j.sysarc.2019.101685.

(Continued)

*Primary Examiner* — Joshua P Lottich
(74) *Attorney, Agent, or Firm* — DENTONS Durham Jones Pinegar

(57) ABSTRACT

A maintenance system of a data storage device identifies which portions of the data storage device are more susceptible to data retention failures and other issues when compared with other portions of the data storage device. Various portions of the data storage device are identified as susceptible portions based on one or more characteristics. When the susceptible portions are identified, the maintenance system determines a frequency at which subsequent maintenance operations will be performed on the susceptible portions. The frequency may be based on the one or more characteristics, an amount of errors in data associated with the susceptible portion or a type of the susceptible portion.

20 Claims, 6 Drawing Sheets

(56) References Cited

U.S. PATENT DOCUMENTS

| | | |
|---|---|---|
| 2023/0043091 A1 | 2/2023 | Chang et al. |
| 2023/0060913 A1 | 3/2023 | Reina et al. |
| 2024/0153570 A1* | 5/2024 | Xu ......................... G11C 29/52 |
| 2024/0295598 A1* | 9/2024 | Mäntysalo ........... H02H 1/0061 |

OTHER PUBLICATIONS

Liao, et al., "Read Refresh Scheduling and Data Reallocation against Read Disturb in SSDs", ACM Transactions on Embedded Computing Systems, vol. 21, No. 2, Article 18. Publication date: Feb. 2022. https://doi.org/10.1145/3495254.

* cited by examiner

400

IDENTIFY PORTION ON WHICH
DATA OPERATIONS WILL BE
PERFORMED — 410

IS PORTION
SUSCEPTIBLE TO
FAILURE? — 420

NO

YES

PERFORM DATA OPERATIONS — 450

ALTER OPERATION PARAMETERS — 430

PERFORM DATA OPERATIONS
WITH ALTERED PARAMETERS — 440

LOCATION-BASED MAINTENANCE OPERATIONS FOR A DATA STORAGE DEVICE

BACKGROUND

Data retention is an ability of a data storage device to retain stored data over a period of time. Read scrubbing operations and data refresh operations are typically used to improve data retention capabilities of the data storage device. In a data refresh operation, data stored in memory dies of the data storage device is periodically read and rewritten. In a read scrubbing operation, a scanning operation is used to determine whether the stored data includes any errors. If errors are found, error-correction codes (ECCs) are used to correct the errors.

The read scrubbing operations and the data refresh operations are typically performed in the background. However, these operations are executed on all areas of the data storage device with the same frequency. For example, these operations are performed on areas of the data storage device that are prone to data retention failures with the same frequency as areas of the data storage device that are not prone to data retention failures.

The data refresh and read scrubbing operations increase the write amplification of the data storage device. These operations also consume resources, which may reduce the overall performance of the data storage device.

Accordingly, it would be beneficial to determine which areas of a data storage device would benefit from data refresh operations and read scrubbing operations and to determine a frequency at which these operations should be performed.

SUMMARY

The present application describes identifying portions or areas of a data storage device that are more prone or susceptible to data retention failures or issues when compared with other portions or areas of the data storage device. In an example, the portions or areas of the data storage device may be arranged in, or otherwise associated with, a hierarchy. For example, a portion of the data storage device may be a memory die, a plane of the memory die, a quadrant of the memory die, a memory block of the memory die and/or a wordline of the memory die.

To determine whether the portion of the data storage device is susceptible to data retention failures (or other types of failures), one or more characteristics of the portion may be determined. In an example, the one or more characteristics are physical characteristics that would cause the portion to be more susceptible to data retention failures. The physical characteristics may include, but are not limited to, a physical location of the portion in the data storage device, a way in which the portion was classified during assembly/fabrication, tolerances associated with assembly/fabrication and the like. In another example, the one or more characteristics of the portion may include non-physical characteristics such as, for example, determined/monitored bit error rates (BER), a number of program/erase (P/E) cycles or other data storage issues.

Once particular portions or areas of the data storage device are identified as being susceptible to data retention failures, a controller or another computing device may issue a read command on data associated with the particular portion, determine a BER of the data, compare the BER to a BER threshold and rewrite the data. In an example, the data is corrected (e.g., using ECCs) as part of the rewrite process. Depending on whether the BER is above the BER threshold, the controller or the computing device may also determine a frequency at which one or more subsequent maintenance operations (e.g., data refresh operations and/or read scrubbing operations) should be performed on the portion.

Accordingly, the present disclosure describes a method that includes identifying one or more characteristics of a first portion of a data storage device. In an example, the first portion of the data storage device is associated with a plurality of portions that are arranged in a hierarchy. A determination is made based, at least in part, on the one or more characteristics, as to whether the first portion of the data storage device is susceptible to a failure. If it is determined that the first portion of the data storage device is susceptible to the failure, data associated with the first portion is read and a BER of the data is determined. The BER may then be compared to a BER threshold. A frequency of a maintenance operation associated with the first portion of the data storage device is then determined. In an example, the frequency is based, at least in part, on the comparison between the BER of the data and the BER threshold.

The present disclosure also describes a data storage device that includes a controller and a memory communicatively coupled to the controller. The memory stores instructions that, when executed by the controller, perform operations. In an example, the operations include identifying a first portion of the data storage device as being susceptible to a first failure and identifying a second portion of the data storage device as being susceptible to a second failure. A first maintenance operation is performed on data associated with the first portion at a first frequency and a second maintenance operation is performed on data associated with the second portion at a second frequency that is different from the first frequency.

The present application also describes a data storage device that includes means for determining whether one or more portions of the data storage device are susceptible to a failure. In an example, the one or more portions of the data storage device are associated with a hierarchy. The data storage device also includes means for determining a BER of data associated with each of the one or more portions of the data storage device that are determined as being susceptible to the failure. The data storage device may also include means for performing a maintenance operation on data associated with the one or more portions of the data storage device. In an example, the maintenance operation is performed on the data associated with the one or more portions based, at least in part, on the BER being above a threshold. The data storage device may also include means for determining a frequency of the maintenance operation. In an example, the frequency is based, at least in part, on one or more characteristics associated with the one or more portions of the data storage device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
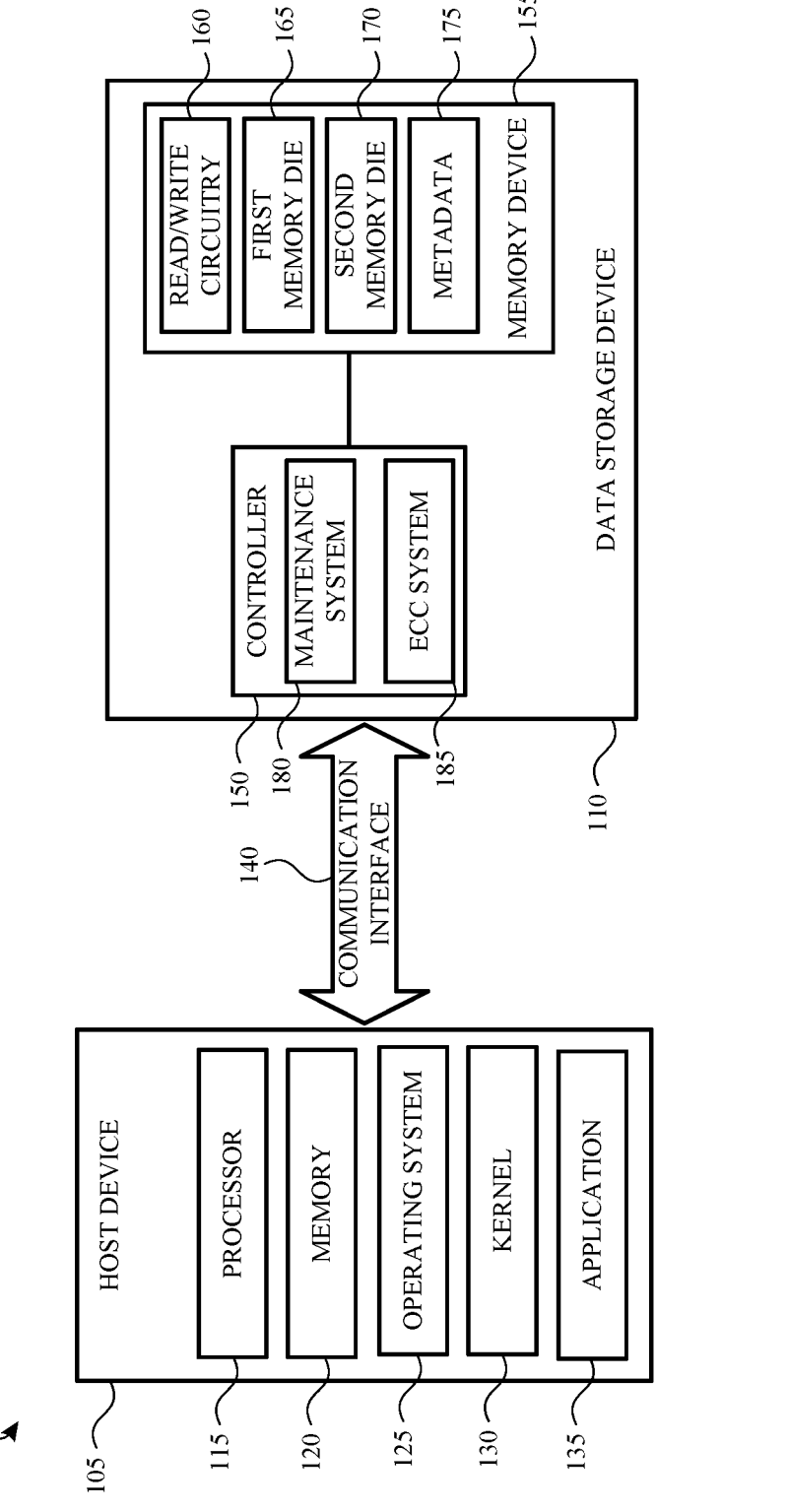
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Examples described herein are directed to systems and methods for identifying areas or portions of a data storage device that are more prone or more susceptible to data retention type failures when compared with other portions of the data storage device. In an example, the data storage device may be logically and/or hierarchically divided into different areas or portions. For example, the portions may be associated with an architecture of the data storage device. In one example, a portion of the data storage device may be a memory die. In another example, the portion may be a plane of the memory die. In yet other examples, a portion may be a quadrant of the memory die, a memory block of the memory die, or a wordline of the memory die.

In an example, one or more portions of the data storage device may be analyzed and/or tested to determine whether it is susceptible to data retention failures or other data failures/issues (e.g., read disturb, program disturb). Each of the one or more portions may be similar portions (e.g., each portion may be a memory die) or each of the one or more portions may be different portions (e.g., one portion may be a memory die and another portion may be a wordline of a memory block associated with the memory die). Thus, a fine level of granularity may be achievable.

In an example, one or more characteristics of each of the one or more portions are analyzed to determine whether the portion is susceptible to data retention failures. The one or more characteristics may be physical characteristics (e.g., characteristics that are manifest during assembly/fabrication). In another example, the one or more characteristics may be determined or discovered in the field (e.g., when the data storage device is being used).

If a portion of the data storage device is identified as being susceptible to data retention failures (or other data failures), data associated with the portion is read and a bit error rate (BER) of the data is determined. The BER may then be compared to a BER threshold. The data may then be corrected and rewritten. In an example, the data is rewritten to the same portion from which it was read. In another example, the data is rewritten to a different portion. Additionally, a frequency of subsequent maintenance operations (e.g., read scrubbing and/or data refresh operations) may be determined. In an example, the frequency is based, at least in part, on the BER associated with the data that was read from the portion and/or the one or more characteristics of the portion.

The controller or other computing device may also determine whether to modify subsequent read and/or write operations that are performed on the portion. For example, if the portion is identified as being susceptible to failures, a higher bias or a longer pulse may be used when data is written to/read from the portion to help ensure data is correctly read from and/or written to the portion.

In accordance with the above, many technical benefits may be realized including, but not limited to increasing a reliability of a data storage device while minimizing write amplifications and reducing background operations that are performed on different portions of the data storage device.

These benefits, along with other examples, will be shown and described in greater detail with respect to FIG. 1-FIG. 6.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write operations and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 may include a controller 150 and a memory device 155. The controller 150 may be communicatively coupled to the memory device 155. In an example, the memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In some examples, the data storage device 110 may be attached to or embedded within the host device 105. In another example, the data storage device 110 may be implemented as an external device or a portable device that can be communicatively or selectively coupled to the host device 105. In yet another example, the data storage device 110 may be a component (e.g., a solid-state drive (SSD)) of a network accessible data storage system, a network-attached storage system, a cloud data storage system, and the like.

As indicated above, the memory device 155 of the data storage device 110 may include a first memory die 165 and a second memory die 170. Although two memory dies are shown, the memory device 155 may include any number of memory dies (e.g., one memory die, two memory dies, eight memory dies, or another number of memory dies).

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

The data storage device 110 and/or the memory device 155 may be arranged in or otherwise associated with a hierarchy. For example, the memory device 155 may include multiple memory dies, and each memory die may include multiple planes and quadrants. Further each plane and/or quadrant may include multiple memory blocks. Each memory block may include multiple wordlines. Each physical (or logical portion) of the data storage device 110 may be referred to as a portion and one or more portions may be more susceptible to failures (e.g., data retention failures, read disturbs, program disturbs) when compared with other portions. This will be explained in greater detail below.

Each of the first memory die 165 and the second memory die 170 may include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

Figure 2A:
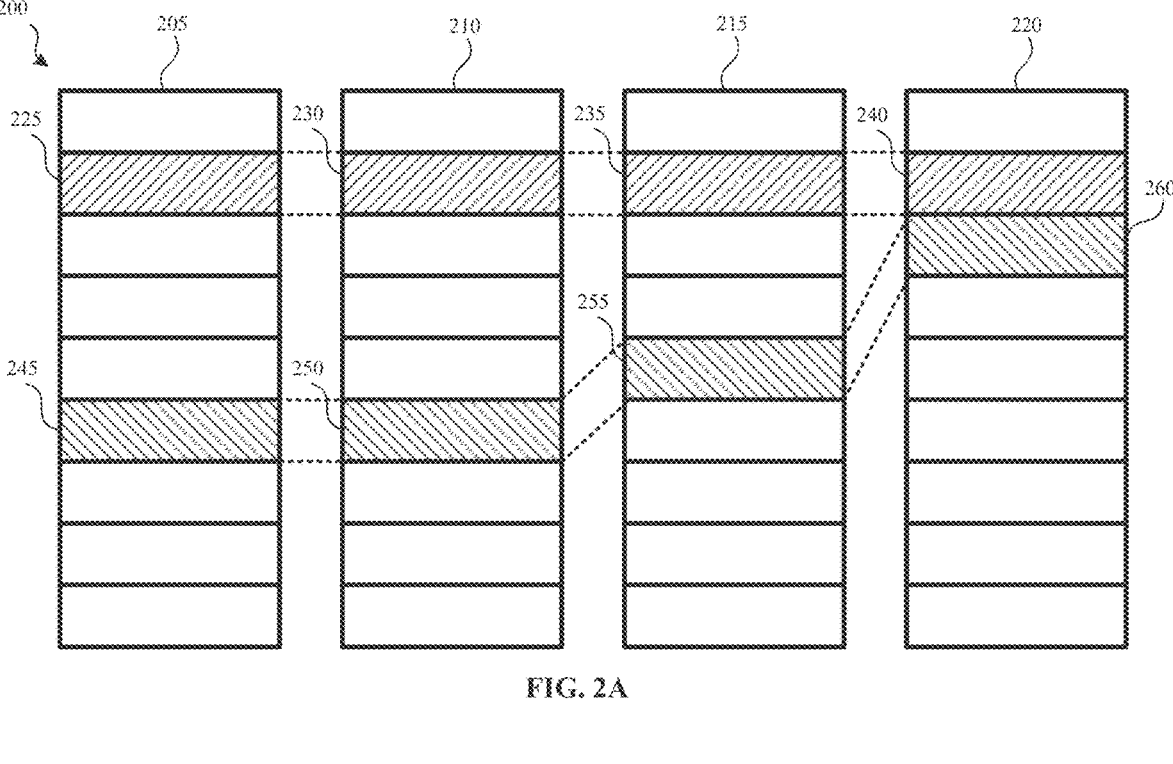
FIG. 2A illustrates a memory die having a number of memory blocks according to an example.

For example and referring to FIG. 2A, a memory device 200 (e.g., a storage element, a memory die, a non-volatile memory device) may include four planes or sub-arrays (e.g., a first plane 205, a second plane 210, a third plane 215, and a fourth plane 220). In an example, the planes may be integrated on a single memory die. In another example, the planes may be provided on two different memory dies (e.g., two planes on each memory die) or on four different memory dies. Although four planes are shown and described, the memory device 200 may have any number of planes and/or memory dies. Each plane may be further divided into one or more quadrants. In an example, a quadrant is a continuous portion of memory blocks in a particular physical location.

The planes may be divided into memory blocks consisting memory cells. As shown in FIG. 2A, rectangles represent each memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks may be logically linked or grouped together (e.g., using a table in or otherwise accessible by the controller 150) to form a metablock. A metablock may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

Figure 2B:
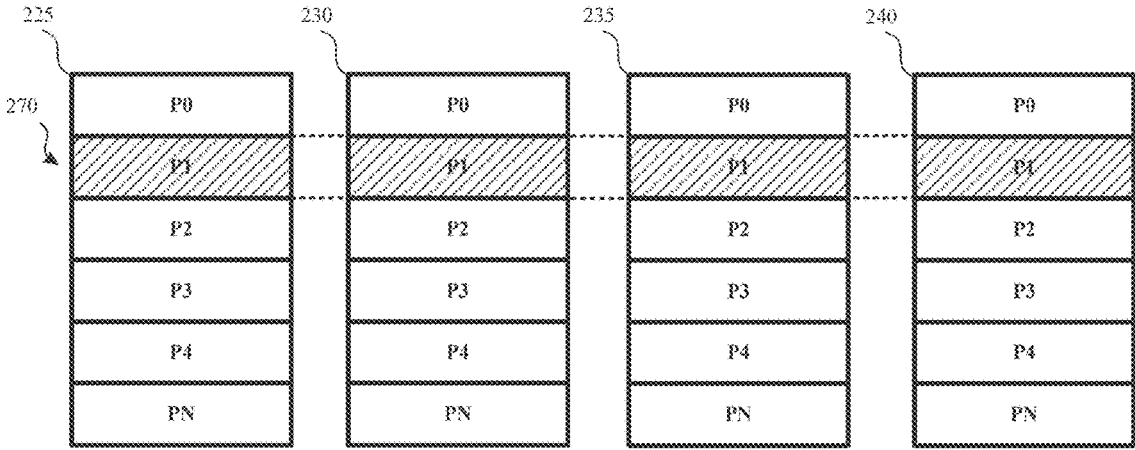
FIG. 2B illustrates a memory block having one or more pages according to an example.

In an example, each memory block may be divided, for operational purposes, into pages of memory cells, such as illustrated in FIG. 2B. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored. Further, each physical memory block may be associated with a particular location on the memory device.

Figure 2C:
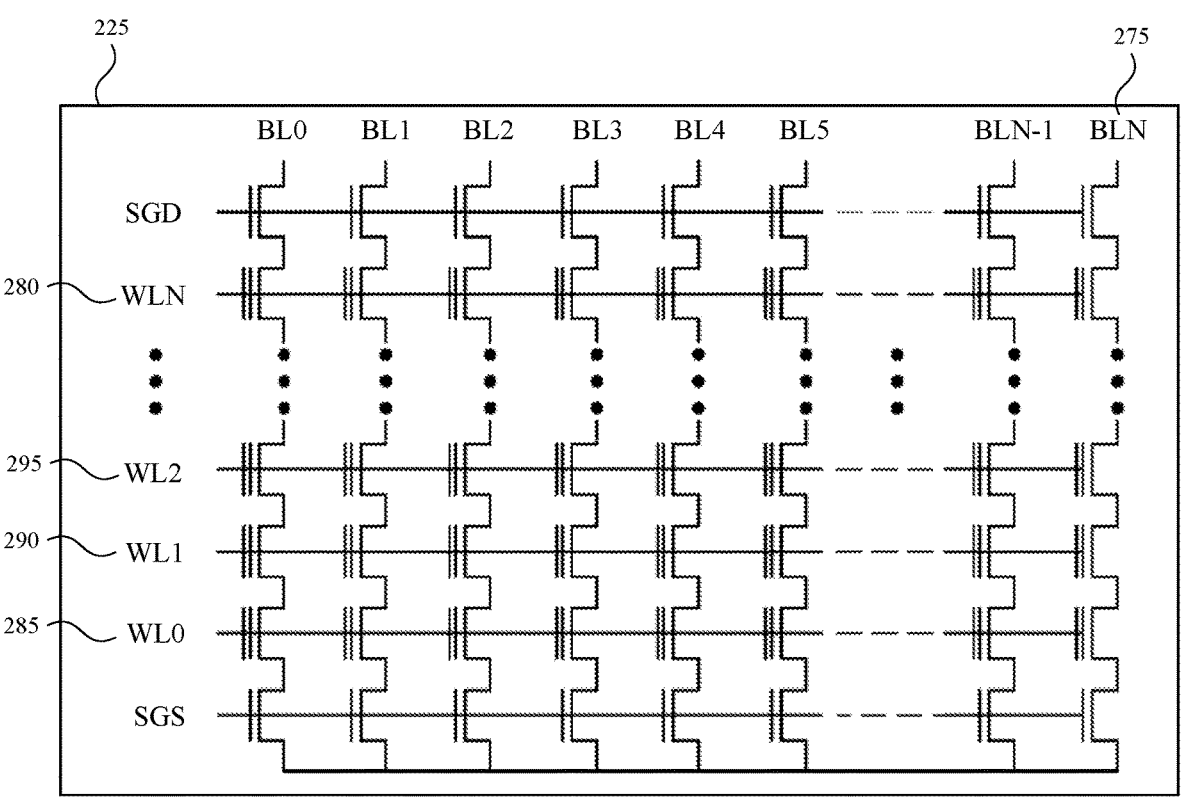
FIG. 2C illustrates a memory block having a number of memory cells according to an example.

As indicated above, each memory block may include any number of memory cells. The design, size, and organization of a memory block may depend on the architecture, design, and application desired for each memory die. In an example, the memory block may be or include a contiguous set of memory cells that share a plurality of wordlines and bit lines. For example and as shown in FIG. 2C, the memory block 225 includes bit lines BL0-BLN (collectively bit lines 275), where N is a total number of bit lines. Additionally, the memory block 225 includes wordlines WL0-WLN (collectively wordlines 280), where N is a total number of wordlines.

A wordline 280 may function as a single-level-cell (SLC) wordline, a multi-level-cell (MLC) wordline, a tri-level-cell (TLC) wordline, a quad-level cell (QLC) wordline, a penta-level cell (PLC) wordline and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

In an example, a wordline 280 may include one or more portions, segments or sections. For example, a wordline 280 may include a first section and a second section. Additionally, each section of the wordline 280 may store data. The stored data may be a codeword that includes a data portion and a parity portion.

Referring back to FIG. 1, each portion of the memory device 155 may have, or otherwise be associated with, one or more characteristics. The one or more characteristics may indicate whether the portion of the data storage device 110 is susceptible to data retention failures (or other failures). The characteristics may be physical characteristics or non-physical characteristics.

In an example, the characteristics may be the result of fabrication and/or manufacturing/assembly processes of the various components of the data storage device 110 and/or the memory device 155. In another example, the characteristics may be the result of different tolerances that are present in the manufacturing, assembly and/or fabrication process. In other examples, the characteristics may be the result of normal wear and tear of the data storage device 110 and/or the memory device 155. For example, as the data storage device 110 gets older (e.g., as the number of program erase (P/E) cycles increases), one or more portions of the memory device 155 may become more susceptible to data retention failures and other issues when compared with other portions. In yet other examples, the characteristics may include a physical location of the portion with respect to other portions of the memory device.

As previously described, the data storage device 110 may also include a controller 150. The controller 150 may be communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 may receive data and/or instructions from the host device 105. The controller 150 may also send data to the host device 105. For example, the controller 150 may send data to and/or receive data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. In an example, the controller 150 may also dynamically and intelligently adjust one or more operations (e.g., read operations and/or write operations) that are performed on the first memory die 165 and/or the second memory die 170 based on a determination as to whether the portion of the memory device 155 is susceptible to failures.

The controller 150 may also send data and/or commands associated with one or more background scanning operations, garbage collection operations, and/or wear leveling operations. The controller 150 may also send one or more read commands to the memory device 155. In an example, the read command specifies the physical address of a portion of the memory device 155 at which the data is stored. The controller 150 may also track the number of P/E cycles or other programming operations that have been performed on or by the memory device and/or the memory dies of the memory device 155.

To determine whether a particular portion of the data storage device is prone/susceptible to data retention failures, the controller 150 may include or otherwise be associated with a maintenance system 180. The maintenance system 180 may analyze each portion of the data storage device 110 to determine its characteristics. If the characteristics indicate that the portion of the data storage device 110 is susceptible to one more types of failures (e.g., data retention failures, read disturbs, program disturbs), the maintenance system 180 causes a maintenance operation (e.g., a read scrubbing operation and/or a data refresh operation) to be performed on the portion.

For example, during an initial data refresh operation, the maintenance system 180 may determine (e.g., based on one or more characteristics) whether the portion of the data storage device is susceptible to failures. As part of this process, the maintenance system 180 will issue a read command on each portion of the memory device 155 that is identified as being susceptible to failures. Once the data is read, the maintenance system 180 may communicate with an error code correction (ECC) system 185 to determine a bit error rate (BER) of the data. The maintenance system 180 may compare the BER of the data to a BER threshold. In an example, the BER threshold may be 0.65% (based on, for example, LDPC hard bit decoding). Although 0.65% is specifically mentioned, other thresholds may be used.

The ECC system 185 may receive data and generate one or more ECC code words based, at least in part, on the received data. The ECC system 185 may include an encoder that encodes the received data using one or more encoding techniques. The ECC system 185 may also include a decoder to decode data read from the memory device 155. The ECC system 185 may also detect and correct bit errors that may be present in the stored/read data. For example, the ECC system 185 may correct a number of bit errors up to an error correction capability of a particular ECC technique used by the ECC system 185.

In an example, the ECC system 185 may also determine or otherwise track a failed bit count, a syndrome weight, a bit error rate and/or other metrics associated with data decoded by the ECC system 185. For example, the ECC system 185 may determine the failed bit count using a test pattern, a read operation or other process. In another example, the ECC system 185 may track or otherwise determine a syndrome weight of read data rather than decoding the read data and counting the failed bit count and/or the number of errors in read data. In yet another example, the number of errors may be based on known test data, a known sequence or a known test pattern generated by or otherwise accessible to the controller 150. For example, the controller 150 may generate a known sequence and compare read data with the known sequence to count a number of failed bits without having to perform an encoding or decoding operation.

Once the errors in the data are identified, the ECC system 185 may correct the data (as needed) and the data may be rewritten or otherwise stored by the memory device 155. In an example, the data is rewritten in the same portion of the memory device 155 from which the data was read. In another example, the data may be rewritten to another portion of the memory device 155.

In an example, if the data is rewritten to the same portion of the memory device 155 from which it was read, the write operation may be modified to help ensure the data is reliable for a longer period of time. For example, a higher voltage or a longer pulse may be used to write the data. In addition, when the data is subsequently read from the portion, the read operation may also be modified to help ensure the data is reliable.

In addition to rewriting/correcting the data, the maintenance system 180 may also determine a frequency of subsequent maintenance operations that will be performed on the susceptible portion of the memory device 155. In an example, the frequency may be based, at least in part, on a degree at which the BER of the data exceeded the BER threshold. In another example, the frequency may be based, at least in part, on the one or more characteristics of the susceptible portion. In yet another example, the frequency may be based, at least in part, on a type of the portion (e.g., whether the portion is a memory die, a block, a wordline). The maintenance system 180 may then cause the maintenance operations to be performed on the susceptible portion at the determined frequency.

The maintenance system 180 may periodically monitor and update the frequency over the life the of the data storage device. For example, as part of subsequent maintenance operations, the maintenance system 180 may determine a BER of data read from the susceptible portion. If the BER is above the BER threshold (or another standard), the frequency may be adjusted. Likewise, if the BER is below the threshold, the frequency may also be adjusted (e.g., to be less frequent).

Different portions of the data storage device 110 may have different characteristics that indicate whether it is susceptible to failures. In an example, a memory die may be more susceptible to failure based on where the die was located on a wafer during a memory die fabrication process. For example, memory dies near the edge of the wafer may be more susceptible to failures when compared with dies that are closer to the center of the wafer.

In another example, the memory die may be more susceptible to failure based on cell characterization data, quality binning in manufacturing/fabrication, field read-retry counts, a depth into a read recovery table, field grown defects, field BER, and/or field read-retry counts. Although specific examples are given, other characteristics may be used to determine whether the memory die is susceptible to failures.

A wordline may also exhibit characteristics that indicate whether the wordline is prone to failures. In an example, wordlines of particular memory blocks may be identified as prone to failures as part of a pre-characterization process performed on or by the memory device 155. In an example, the pre-characterization process helps identify defects and/or variations that may be present in the memory device 155.

The pre-characterization process may include a series of tests that are performed on the memory device 155 to measure performance parameters of the memory device 155. These performance parameters may include a read speed and write speed of the memory device 155, power consumption parameters of the memory device 155 and/or the endurance of the memory device 155. In an example, the pre-characterization process may include a read disturb testing process executed on/by the memory device 155. In an example, the pre-characterization process may enable the maintenance system 180 to know the susceptible wordlines on a per-memory die basis.

The maintenance system 180 may also determine whether a plane is susceptible to failures based, at least in part, on one or more characteristics of the plane. For example, the maintenance system 180 may determine that planes located at or near the edge of a memory die are more susceptible to failure when compared to planes that are closer to the center of the memory die. In another example, each plane of a memory die (or planes from multiple memory dies) may exhibit different behaviors due to different film thickness and/or process variations. Further, each plane of a memory die may simply perform differently.

Likewise, one or more quadrants may be more susceptible to failure than other quadrants for similar reasons. However, the determination of which quadrants are susceptible to failure may be more granular when compared to planes. For example, quadrants that are located on corners or are nearest the edge of a memory die may be more susceptible to failures when compared with quadrants in the middle of the wafer.

In yet another example, the maintenance system 180 may analyze the data itself to determine whether the data is "old" (e.g., how long the data has been stored in the particular portion). For example, the longer the data is stored, the more likely it is to become corrupted due to charge loss. As such, if a memory block contains "old" data, the maintenance system 180 may perform a maintenance operation on the data. In yet another example, a read count and/or a number of P/E cycles may also be considered when determining whether data stored in a particular portion should undergo a refresh operation.

When a portion of the memory device 155 has been identified as susceptible to failures and/or when a frequency of maintenance operations is determined/updated, information associated with each susceptible portion may be stored as metadata 175. In an example, the metadata 175 may include information corresponding a physical address/location of the susceptible portion, a type of the susceptible portion, a logical address of the susceptible portion, and so on. The metadata 175 may also indicate a number of P/E cycles associated with the susceptible portion, a failed bit count (FBC) associated with the susceptible portion, a syndrome weight, a bit error rate (BER), and/or a status indicator of the susceptible portion.

The maintenance system 180 may cause the maintenance operations to run as multiple instances and/or at different frequencies. For example, the maintenance operations and/or status checks may be performed on older memory blocks at a first rate/frequency, maintenance operations and/or status checks on wordlines that are susceptible to failures may be performed at second rate/frequency, status checks and/or maintenance operations on susceptible memory dies, planes, quadrants, and memory blocks may be performed at a third rate/frequency while status checks and/or maintenance operations on portions of the memory device 155 that are not susceptible to failures may occur at a fourth rate/frequency.

In an example, the frequency at which the maintenance operations are executed may be self-attenuating. For example, the maintenance system 180 may analyze various portions and determine which portions are susceptible to failure. The maintenance system 180 may also determine an initial frequency at which maintenance operations should be performed on those portions.

Over time, the maintenance system 180 may update the frequency (e.g., increase or decrease the frequency) of the maintenance operations each time the maintenance operations are performed. Thus, the maintenance system 180 may dynamically determine a frequency at which maintenance operations should be performed on different portions of the memory device 155. In yet another example, the frequency may be based on fixed data (e.g., data that is based on a system architecture, data that is discovered during manufacturing).

In some examples, once the susceptible portions of the memory device 155 have been identified, the maintenance system 180 may also take measures to help ensure the failures are prevented. In one example, the maintenance system 180 may prevent or restrict operations (e.g., read and/or write operations) from being performed on the portions that are identified as being susceptible to failures. In another example, read operations and/or write operations may be modified for the portions that are identified as being susceptible to failures.

For example, the maintenance system 180 may select one wordline from a defined wordline zone (e.g., a grouping of wordlines associated with a memory block). The maintenance system 180 may determine whether the selected wordline of the wordline zone is susceptible to failure in a similar manner as previously described. Additionally, the maintenance system 180 may track different read level shifts that are applied to each wordline. As such, the maintenance system 180 may learn the behavior of each zone and/or whether the wordline zone is susceptible to failures. For example, using the normal behavior of the wordline zone (e.g., knowing the various voltage shifts that are applied to the wordline zone), the maintenance system 180 may identify which wordline zones or memory blocks are more susceptible to failure.

In order to combat this, the maintenance system can program the wordlines of the wordlines zones based on the behavior. For example, the wordlines may be programmed using a higher bias or a longer pulse to ensure the states are programmed accurately. Additionally, read level shifts can be adjusted to accommodate the higher bias and/or the longer pulse, thereby helping ensure data is written accurately and read accurately.

As such, the maintenance system 180 may adjust the various failure countermeasures described herein based on individual portions (down to a wordline level) and intelligently prevent various failures. The intelligence may be applied to high BERs and may also consider the number of P/E cycles of the memory device 155.

Figure 3:
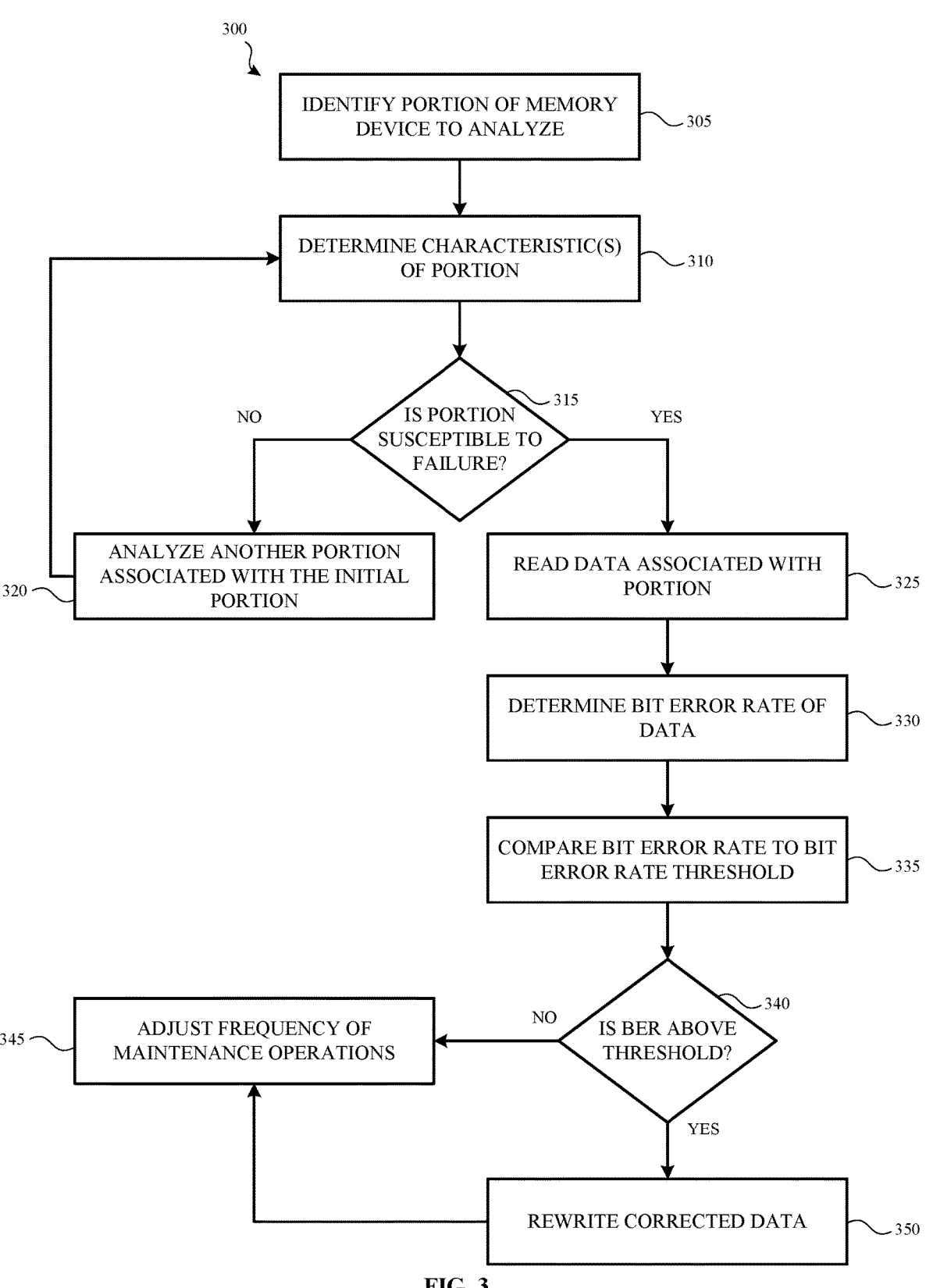
FIG. 3 illustrates a method for determining whether a portion of a data storage device is susceptible to failures according to an example.

FIG. 3 illustrates a method 300 for determining whether a portion of a data storage device is susceptible to failures according to an example. In an example, the method 300 may be performed by a controller such as, for example, the controller 150 shown and described with respect to FIG. 1. In another example, the method 300 may be performed by a host device, such as, for example, host device 105 shown and described with respect to FIG. 1.

Method 300 begins when an identified (305) portion of a memory device is analyzed. In an example, the portion of the memory device is first identified when a data storage device or a memory device is undergoing an initial data refresh operation (or other maintenance operation). As such, the entire memory device may be analyzed at least once to determine whether one or more portions are susceptible to failures.

In an example and as part of the initial data refresh operation, a LBA is selected by a host device or a controller associated with the memory device. In an example, LBA may be chosen randomly. In another example, an initial LBA is selected and subsequent LBAs that are selected are selected in sequence.

Once the LBA is selected, the physical location/address of the portion is identified and one or more characteristics of the identified portion are determined (310). In an example, the one or more characteristics may be used to identify which portions are more susceptible to failures when compared with other portions.

The one or more characteristics may be physical characteristics of the portion. For example, the physical characteristics may include a physical location of the portion with respect to other component/portions of the data storage device. In another example, the physical characteristics may include a way in which the portion was classified during assembly/fabrication, tolerances associated with assembly/fabrication and the like.

In another example, the one or more characteristics may be non-physical characteristics. For example, the one or more characteristics may be the number of P/E cycles associated with the portion and/or a determined/monitored bit error rates (BER) of data stored by or otherwise associated with the portion.

When the one or more characteristics of the portion are identified, a determination (315) is made as to whether the portion is susceptible to failures. In an example, the failures may be data retention failures. In another example, the failures may be read disturb failures/issues, program disturb failures/issues and/or similar failures/issues.

If it is determined that the portion is not susceptible to failures, another portion of the memory device is analyzed (320). In an example, the portion that is subsequently selected is associated with the initial portion. For example, the initial portion may be a memory die of the memory device. If it is determined that the memory die is not susceptible to failures, a wordline associated with the memory die may be selected for analysis and operations 310 and 315 may be repeated.

Likewise, if it is determined that the wordline is not susceptible to failures, a plane of the memory die may be analyzed and operations 310 and 315 may be repeated again. If it is determined that the plane is not susceptible to failures, a quadrant associated with the memory die may be selected for analysis and operations 310 and 315 may be repeated. If it is determined that the quadrant is not susceptible to failures, a memory block of the memory die may be analyzed and operations 310 and 315 may be repeated. Although a specific order is mentioned, each portion may be analyzed in any order.

Additionally, physical characteristics of data associated with the portions may also be analyzed to determine how long the data has been stored in the portion. If the data has been stored for under a threshold amount of time, the host device and/or the controller may select another LBA and the method 300 may be repeated.

However, if it is determined (315) that the portion is susceptible to failure (and/or that the data stored in the portion has been stored for over the threshold amount of time), data associated with the portion is read (325). As part of the read operation, a BER of the data is determined (330) and compared (335) to a threshold BER. In an example, the threshold BER is 0.65% and is based on LDPC hard bit decoding capabilities of the memory device. Although 0.65% is mentioned, the threshold may be higher or lower than 0.65%. Additionally, the threshold may dynamically change based on various factors (e.g., an age of the memory device, a number of P/E cycles associated with each portion).

If it is determined (340) that the BER of the data is above the BER threshold, the data associated with the portion is corrected (as needed) and rewritten (350). In an example, the data may be rewritten in the same portion or in a different portion. Information about whether the portion is susceptible to failures, as well as the frequency of subsequent maintenance operations, may also be stored by the memory device. In addition to rewriting the data, a frequency of one or more maintenance operations is determined and/or adjusted (345). In an example, the frequency is based, at least in part, on one or more of the characteristics of the portion, a degree at which the BER of the data exceeds the BER threshold and/or a type of the portion (e.g., whether the portion is a memory die, a wordline, etc.).

If it is determined (340) that the BER of the data is not above the BER threshold, it may not be necessary to correct and/or rewrite the data. However, a frequency of subsequent maintenance operations may be adjusted (345).

In an example, the adjustment to the frequency of subsequent maintenance operations may be based, at least in part, on a time frame in which the data was most recently corrected. For example, if the data was last corrected within a threshold amount of time, the frequency of one or more subsequent maintenance operations may not need to be adjusted. However, if the data was last corrected over a threshold amount of time, the frequency of one or more subsequent maintenance operations may be updated to occur more frequently (e.g., when compared with a current maintenance operation schedule). The method 300 may then be repeated for another identified portion.

In another example, a frequency of maintenance operations may be adjusted even if the BER is below the BER threshold. For example, if the BER of the data is below the BER threshold, the frequency of subsequent maintenance operations may be updated so that the subsequent maintenance operations occur more frequently or less frequently.

Figure 4:
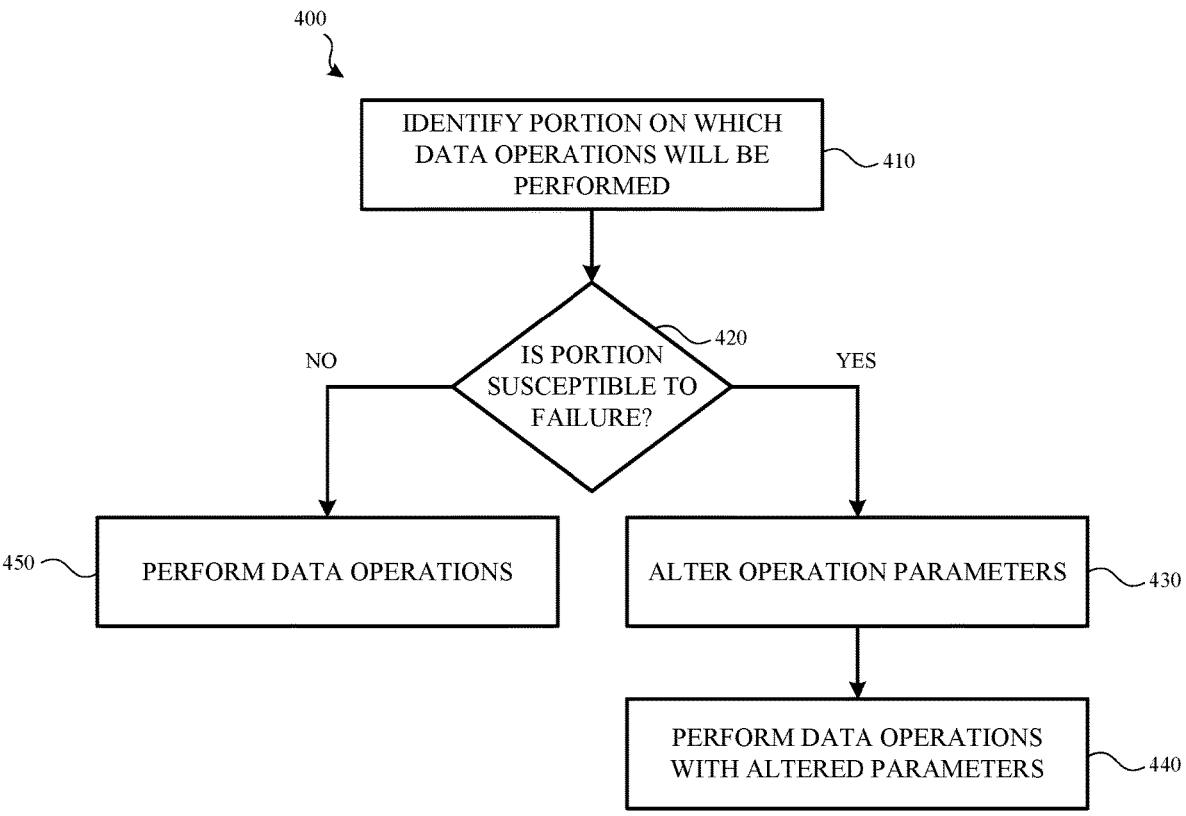
FIG. 4 illustrates a method for performing operations on portions of a data storage device that are susceptible to failures according to an example.

FIG. 4 illustrates a method 400 for storing data in portions of a data storage device that are susceptible to failures according to an example. In an example, the method 400 may be performed by a controller such as, for example, the controller 150 shown and described with respect to FIG. 1. In another example, the method 400 may be performed by a host device, such as, for example, host device 105 shown and described with respect to FIG. 1.

Method 400 begins when a portion of a memory device is identified (410). In an example, the portion of the memory device is identified based, at least in part, on a received data operation (e.g., a received read or write operation). When the portion is identified, a determination (420) is made as to whether the portion is susceptible to failures.

In an example, the determination may be based, at least in part, on metadata associated with the identified portion. For example, the portion may have been identified as susceptible to failures based, at least in part, on the method 300 shown and described with respect to FIG. 3.

If it is determined (420) that the portion is not susceptible to failures, the data operations may be performed (450). In an example, the data operations are performed based on known or discovered behaviors of the portion.

However, if it is determined (420) that the portion is susceptible to failures, the operation parameters of the data operations may be altered (430). For example, a higher voltage or a longer pulse may be used to write data in a particular portion if the portion was identified as being susceptible to failures. Once the parameters have been altered or otherwise updated, the data operations may be performed (440) on the portion using the altered parameters.

Figures 5, 6:
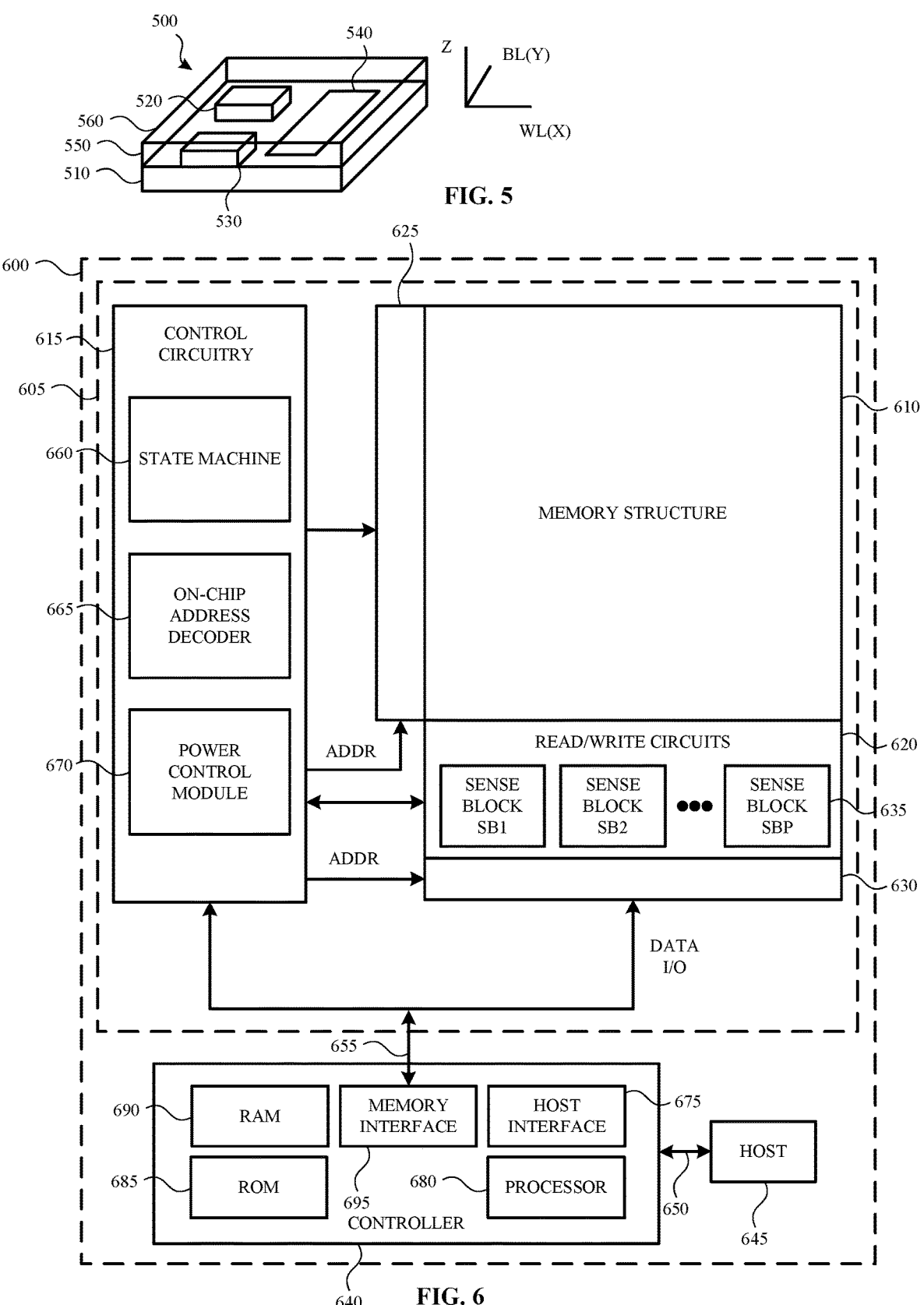
FIG. 5 is a perspective view of a storage device that includes three-dimensional (3D) stacked non-volatile memory according to an example.
FIG. 6 is a block diagram of a storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 640 shown and described with respect to FIG. 6 may be similar to the controller 150 of FIG. 1. Likewise, the memory dies 605 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks may include a first block 520 (BLK0) and a second block 530 (BLK1). Each block may be formed of memory cells (e.g., non-volatile memory elements). The substrate 510 may also include a peripheral area 540 having support circuits that are used by the first block 520 and the second block 530. The peripheral area 540 may be located beneath the first block 520 and the second block 530. In another example, the peripheral area may be included on a different substrate or die.

The substrate 510 may also carry circuits under the blocks, along with one or more lower metal layers which are patterned in conductive paths to carry signals from the circuits. The blocks may be formed in an intermediate region 550 of the storage device 500. The storage device may also include an upper region 560. The upper region 560 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 510 in the x-direction represents a direction in which signal paths for wordlines or control gate lines extend (e.g., a wordline or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 may be the 3D stacked non-volatile storage device 500 shown and described with respect to FIG. 5. The components depicted in FIG. 6 may be electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by wordlines using a first decoder 625 (e.g., a row decoder) and by bit lines using a second decoder 630 (e.g., a column decoder). The read/write circuits 620 may also include multiple sense blocks 635 including SB1, SB2 . . . SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605.

Commands and data may be transferred between a host 645 and the controller 640 using a data bus 650. Commands and data may also be transferred between the controller 640 and one or more of the memory dies 605 by way of lines 655. In one example, the memory die 605 includes a set of input and/or output (I/O) pins that connect to lines 655.

The memory structure 610 may also include one or more arrays of memory cells. The memory cells may be arranged in a three-dimensional array or a two-dimensional array. The memory structure 610 may include any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 may also include a state machine 660, an on-chip address decoder 665, and a power control module 670. The state machine 660 may provide chip-level control of various memory operations. The state machine 660 may be programmable by software. In another example, the state machine 660 does not use software and is completely implemented in hardware (e.g., electrical circuits).

The on-chip address decoder 665 may provide an address interface between addresses used by host 645 and/or the controller 640 to a hardware address used by the first decoder 625 and the second decoder 630.

The power control module 670 may control power and voltages that are supplied to the wordlines and bit lines during memory operations. The power control module 670 may include drivers for wordline layers in a 3D configuration, select transistors (e.g., SGS and SGD transistors) and source lines. The power control module 670 may include one or more charge pumps for creating voltages.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 675, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more wordlines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 675, in communication with the ROM 685, the RAM 690, and the one or more processors 680, may be an electrical circuit that provides an electrical interface between the controller 640 and the host 645. For example, the host interface 675 may change the format or timing of signals, provide a buffer, isolate from surges, latch I/O, and so on. Commands and data from the host 645 are received by the controller 640 by way of the host interface 675. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

Based on the above, examples of the present disclosure describe a method, comprising: identifying one or more characteristics of a first portion of a data storage device, the first portion of the data storage device being associated with a plurality of portions arranged in a hierarchy; determining, based at least in part, on the one or more characteristics, whether the first portion of the data storage device is susceptible to a failure; and based, at least in part, on determining the first portion of the data storage device is susceptible to the failure: reading data associated with the first portion; determining a bit error rate associated with the data; comparing the bit error rate to a bit error rate threshold; and determining a frequency of a maintenance operation associated with the first portion of the data storage device, wherein the frequency is based, at least in part, on the comparing of the bit error rate to the bit error rate threshold. In an example, the method also includes identifying one or more characteristics of a second portion of the data storage device, the second portion of the data storage device being associated with the plurality of portions; determining, based at least in part, on the one or more characteristics of the second portion, whether the second portion of the data storage device is susceptible to a failure; and based, at least in part, on determining the second portion of the data storage device is susceptible to the failure: reading data associated with the second portion; determining a bit error rate associated with the data; comparing the bit error rate to the bit error rate threshold; and determining a frequency of a maintenance operation associated with the second portion of the data storage device, wherein the frequency is based, at least in part, on the comparing of the bit error rate to the bit error rate threshold and wherein the frequency of the data refresh operation associated with the second portion of the data storage device is different than the frequency of the data refresh operation associated with the first portion of the data storage device. In an example, the one or more characteristics of the first portion of the data storage device are one or more physical characteristics. In an example, the first portion of the data storage device is selected from a group, comprising: a memory die; a plane; a block; a wordline; and a quadrant. In an example, the method also includes performing the maintenance operation at the determined frequency on the data associated with the first portion. In an example, the method also includes adjusting one or more write parameters associated with a write operation of the maintenance operation based, at least in part, on a location at which the data is written. In an example, the method also includes adjusting one or more read parameters associated with the data based, at least in part, on the location at which the data is written. In an example, the one or more write parameters are based, at least in part, on a number of program/erase (P/E) cycles associated with the location at which the data is written. In an example, the location is associated with the first portion. In an example, the method also includes storing information that indicates the first portion is susceptible to the failure.

Examples of the present disclosure also describe a data storage device, comprising: a controller; and a memory communicatively coupled to the controller and storing instructions that, when executed by the controller, perform operations, comprising: identifying a first portion of the data storage device as being susceptible to a first failure; identifying a second portion of the data storage device as being susceptible to a second failure; performing a first maintenance operation on data associated with the first portion at a first frequency; and performing a second maintenance operation on data associated with the second portion at a second frequency that is different from the first frequency. In an example, the instructions also include instructions for performing a third maintenance operation on a third portion of the data storage device at a third frequency, wherein the third frequency is less frequent than the first frequency and the second frequency. In an example, the instructions also include instructions for determining a bit error rate associated with data stored by the first portion; comparing the bit error rate to a bit error rate threshold; and determining the first frequency of the maintenance operation, based, at least in part, on the comparison of the bit error rate and the bit error rate threshold. In an example, identifying the first portion of the data storage device as being susceptible to the first failure is based, at least in part, on one or more physical characteristics of the first portion of the data storage device. In an example, the first portion of the data storage device is selected from a group, comprising: a memory die; a plane; a block; a wordline; and a quadrant. In an example, the instructions also include instructions for adjusting one or more write parameters associated with a write operation of the maintenance operation based, at least in part, on a location at which the data associated with the first portion is rewritten. In an example, the instructions also include instructions for adjusting one or more read parameters associated with the rewritten data based, at least in part, on the location at which the data is rewritten.

Examples also describe a data storage device, comprising: means for determining whether one or more portions of a data storage device are susceptible to a failure, the one or more portions of the data storage device being associated with a hierarchy; means for determining a bit error rate of data associated with each of the one or more portions of the data storage device that are determined as being susceptible to the failure; means for performing a maintenance operation on data associated with the one or more portions of the data storage device, wherein the maintenance operation is performed on the data associated with the one or more portions based, at least in part, on the bit error rate being above a threshold; and means for determining a frequency of the maintenance operation, wherein the frequency is based, at least in part, on one or more characteristics associated with the one or more portions of the data storage device. In an example, the data storage device also includes means for storing information that indicates the one or more portions of the data storage device are susceptible to the failure. In an example, the data storage device also includes means for adjusting a read parameter associated with the one or more portions based, at least in part, on one or more write parameters associated with the maintenance operation.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/ or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
identifying one or more characteristics of a first portion of a data storage device, the first portion of the data storage device being associated with a plurality of portions arranged in a hierarchy;

determining, based at least in part, on the one or more characteristics, whether the first portion of the data storage device is susceptible to a failure; and based, at least in part, on a determination that the first portion of the data storage device is susceptible to the failure:

reading data from a physical memory block associated with the first portion;

determining a bit error rate associated with the data;

comparing the bit error rate to a bit error rate threshold;

determining a current frequency of a maintenance operation associated with the first portion of the data storage device;

determining an updated frequency of the maintenance operation associated with the first portion of the data storage device, the updated frequency of the maintenance operation being based, at least in part, on a determination that the bit error rate exceeds the bit error rate threshold; and performing the maintenance operation on the data associated with the first portion of the data storage device with the updated frequency, the maintenance operation including correcting errors in the data associated with the first portion of the data storage device and rewriting the data to another physical memory block.

2. The method of claim 1, further comprising:

identifying one or more characteristics of a second portion of the data storage device, the second portion of the data storage device being associated with the plurality of portions;

determining, based at least in part, on the one or more characteristics of the second portion, whether the second portion of the data storage device is susceptible to a failure; and based, at least in part, on a determination that the second portion of the data storage device is susceptible to the failure:

reading second data from a physical memory block associated with the second portion;

determining a bit error rate associated with the second data;

comparing the bit error rate associated with the second data to the bit error rate threshold;

determining a second current frequency of a second maintenance operation associated with the second portion of the data storage device;

determining a second updated frequency of the second maintenance operation associated with the second portion of the data storage device based, at least in part, on a determination that the bit error rate associated with the second data falls below the bit error rate threshold; and performing the second maintenance operation on the second data associated with the second portion of the data storage device at the second updated frequency, wherein the second updated frequency of the second maintenance operation associated with the second portion of the data storage device is different than the updated frequency of the maintenance operation associated with the first portion of the data storage device.

3. The method of claim 1, wherein the one or more characteristics of the first portion of the data storage device are one or more physical characteristics.

4. The method of claim 1, wherein the first portion of the data storage device is selected from a group, comprising:

a memory die;

a plane;

a block;

a wordline; and a quadrant.

5. The method of claim 1, further comprising adjusting one or more write parameters associated with a write operation of the maintenance operation based, at least in part, on a location at which the data is written.

6. The method of claim 5, further comprising adjusting one or more read parameters associated with the data based, at least in part, on the location at which the data is written.

7. The method of claim 5, wherein the one or more write parameters are based, at least in part, on a number of program/erase (P/E) cycles associated with the location at which the data is written.

8. The method of claim 5, wherein the location is associated with the first portion.

9. The method of claim 1, further comprising storing information that indicates the first portion is susceptible to the failure.

10. A data storage device, comprising:

a controller; and a maintenance system associated with the controller and operable to:

perform a first maintenance operation on a first portion of the data storage device at a first frequency;

perform a second maintenance operation on a second portion of the data storage device at a second frequency;

determine whether the first portion of the data storage device is susceptible to a first failure;

determine whether the second portion of the data storage device is susceptible to a second failure;

perform the first maintenance operation on first data associated with the first portion at a first updated frequency based, at least in part, on determining the first portion of the data storage device is susceptible to the first failure, wherein the first updated frequency is different from the first frequency and wherein the first maintenance operation includes correcting errors in the first data and rewriting the first data to a first physical memory block; and perform the second maintenance operation on second data associated with the second portion at a second updated frequency based, at least in part, on determining the second portion of the data storage device is susceptible to the second failure, wherein the second updated frequency is different from the second frequency and wherein the second maintenance operation includes correcting errors in the second data and rewriting the second data to a second physical memory block.

11. The data storage device of claim 10, wherein the maintenance system is further operable to perform a third maintenance operation on a third portion of the data storage device at a third frequency, wherein the third frequency is less frequent than at least one of the first updated frequency and the second updated frequency.

12. The data storage device of claim 10, wherein the maintenance system is further operable to:

determine a bit error rate associated with data stored by the first portion;

compare the bit error rate to a bit error rate threshold; and determine the first updated frequency of the first maintenance operation, based, at least in part, on the comparison of the bit error rate and the bit error rate threshold.

13. The data storage device of claim 10, wherein the determination as to whether the first portion of the data storage device is susceptible to the first failure is based, at least in part, on one or more physical characteristics of the first portion of the data storage device.

14. The data storage device of claim 10, wherein the first portion of the data storage device is selected from a group, comprising:
a memory die;
a plane;
a block;
a wordline; and
a quadrant.

15. The data storage device of claim 10, wherein the maintenance system is further operable to adjust one or more write parameters associated with a write operation of one or more of the first maintenance operation and the second maintenance operation based, at least in part, on a location at which one or more of the first data and the second data is rewritten.

16. The data storage device of claim 15, wherein the maintenance system is further operable to adjust one or more read parameters associated with the rewritten data based, at least in part, on the location at which the data is rewritten.

17. A data storage device, comprising:
means for determining whether one or more portions of a data storage device are susceptible to one or more failures, the one or more portions of the data storage device being associated with a hierarchy;
means for determining a bit error rate of data associated with each of the one or more portions of the data storage device that are determined as being susceptible to the one or more failures;

means for comparing the bit error rate of the data associated with each of the one or more portions of the data storage device that are determined as being susceptible to the one or more failures to a bit error rate threshold;
means for determining a current frequency of a maintenance operation associated with the one or more portions of the data storage device that are determined as being susceptible to the one or more failures;
means for determining an updated frequency of the maintenance operation, wherein the means for determining the updated frequency of the maintenance operation determines the updated frequency of the maintenance operation based, at least in part on one or more of the bit error rate of the data associated with each of the one or more portions of the data storage device exceeding the bit error rate threshold and on one or more characteristics associated with the one or more portions of the data storage device; and
means for performing the maintenance operation on the one or more portions of the data storage device at the updated frequency, the maintenance operation including correcting errors in the data associated with the one or more portions of the data storage device and rewriting the data to other physical memory blocks.

18. The data storage device of claim 17, further comprising means for storing information that indicates the one or more portions of the data storage device are susceptible to the one or more failures.

19. The data storage device of claim 17, further comprising means for adjusting a read parameter associated with the one or more portions based, at least in part, on one or more write parameters associated with the maintenance operation.

20. The data storage device of claim 17, further comprising means for adjusting a write parameter associated with the maintenance operation.

* * * * *